US 8,862,804 B2

(12) United States Patent
Horn

(10) Patent No.: US 8,862,804 B2
(45) Date of Patent: Oct. 14, 2014

(54) SYSTEM AND METHOD FOR IMPROVED PARITY DETERMINATION WITHIN A DATA REDUNDANCY SCHEME IN A SOLID STATE MEMORY

(75) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 374 days.

(21) Appl. No.: 13/098,356

(22) Filed: Apr. 29, 2011

(65) Prior Publication Data

US 2012/0278531 A1     Nov. 1, 2012

(51) Int. Cl.
*G06F 11/10*     (2006.01)

(52) U.S. Cl.
CPC .......... *G06F 11/1068* (2013.01); *G06F 11/108* (2013.01)
USPC ........................................... 711/103; 711/141

(58) Field of Classification Search
None
See application file for complete search history.

(56) References Cited

U.S. PATENT DOCUMENTS

| 6,934,904 B2 | 8/2005 | Talagala et al. |
| 7,149,846 B2 | 12/2006 | Hetrick |
| 7,409,492 B2 | 8/2008 | Tanaka et al. |
| 2006/0085593 A1 | 4/2006 | Lubbers et al. |
| 2008/0141054 A1 | 6/2008 | Danilak |
| 2008/0155160 A1 | 6/2008 | McDaniel |
| 2008/0168304 A1 | 7/2008 | Flynn et al. |
| 2009/0240873 A1 | 9/2009 | Yu et al. |
| 2010/0017650 A1 | 1/2010 | Chin et al. |
| 2010/0049914 A1 | 2/2010 | Goodwin |
| 2010/0100664 A1 | 4/2010 | Shimozono |
| 2010/0125695 A1 | 5/2010 | Wu et al. |
| 2010/0146197 A1* | 6/2010 | Gorobets ...................... 711/103 |
| 2010/0169571 A1* | 7/2010 | Kamalavannan et al. .... 711/114 |
| 2010/0180076 A1* | 7/2010 | Sundrani ...................... 711/114 |

* cited by examiner

*Primary Examiner* — Matthew Bradley
*Assistant Examiner* — Candice Rankin

(57) ABSTRACT

Embodiments of the invention are directed to improving parity determination in a data redundancy scheme. In a block oriented storage system, where the storage element block size is an integer multiple of the block size used on the host interface, parity can be calculated on clean boundaries of the host block. However, this is not always the case and storage inefficiency occurs as a result. Embodiments of the invention optimize RAID parity calculation in a non-volatile solid state device by allowing the RAID stripe depth (also termed a "strip") to be a non-integer multiple of the size of the individual storage element, i.e., the non-volatile memory program granularity. This enables efficient use of storage space where the host data size does not match the storage element size of the non-volatile memory while providing a straightforward way of handling parity generation and data recovery.

13 Claims, 5 Drawing Sheets

SYSTEM AND METHOD FOR IMPROVED PARITY DETERMINATION WITHIN A DATA REDUNDANCY SCHEME IN A SOLID STATE MEMORY

BACKGROUND

1. Technical Field

This disclosure relates to non-volatile storage systems, including but not limited to flash drives. More particularly, the disclosure relates to systems and methods for improving parity determination in a data redundancy scheme in a solid state memory.

2. Description of the Related Art

Many data storage components such as hard disks and solid state drives have certain advertised reliability guarantees that the manufacturers provide to customers. For example, certain solid state drive manufacturers guarantee a frequency of data loss of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups providing mirroring and/or error checking mechanisms. For example, various storage elements of a solid state storage device may be combined into redundancy stripes in which data is stored, with the stripes being protected by some form of parity.

BRIEF DESCRIPTION OF THE DRAWINGS

Systems and methods which embody the various features of the invention will now be described with reference to the following drawings, in which.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

Embodiments of the invention are directed to improving parity determination by selecting a size of an element within a redundancy stripe (i.e., a strip) that corresponds to a data size used by a host operating system instead of the size of the individual storage element in the non-volatile memory. Redundant RAID (1, 10, 5, 6, 50, 60) is a well-known technique for increasing data reliability beyond the failure rate of an individual storage device. A common approach to overcome storage element failure is to use redundant RAID (mirroring, parity, etc.) to allow data recovery should one or more failures occur. For example, in RAID 5, data is organized into stripes where each stripe consists of a set of storage elements with one designated as parity. In a block oriented storage system, where the storage element block size is an integer multiple of the block size used on the host interface, parity can be calculated on clean boundaries of the host block, which is also termed a "sector." However, this is not always the case and storage inefficiency occurs as a result. Embodiments of the invention optimize RAID parity calculation in a non-volatile solid state device by allowing the RAID stripe depth (also termed a "strip") to be a non-integer multiple of the size of the individual storage element, i.e., the non-volatile memory program granularity.

System Overview

Figure 1:
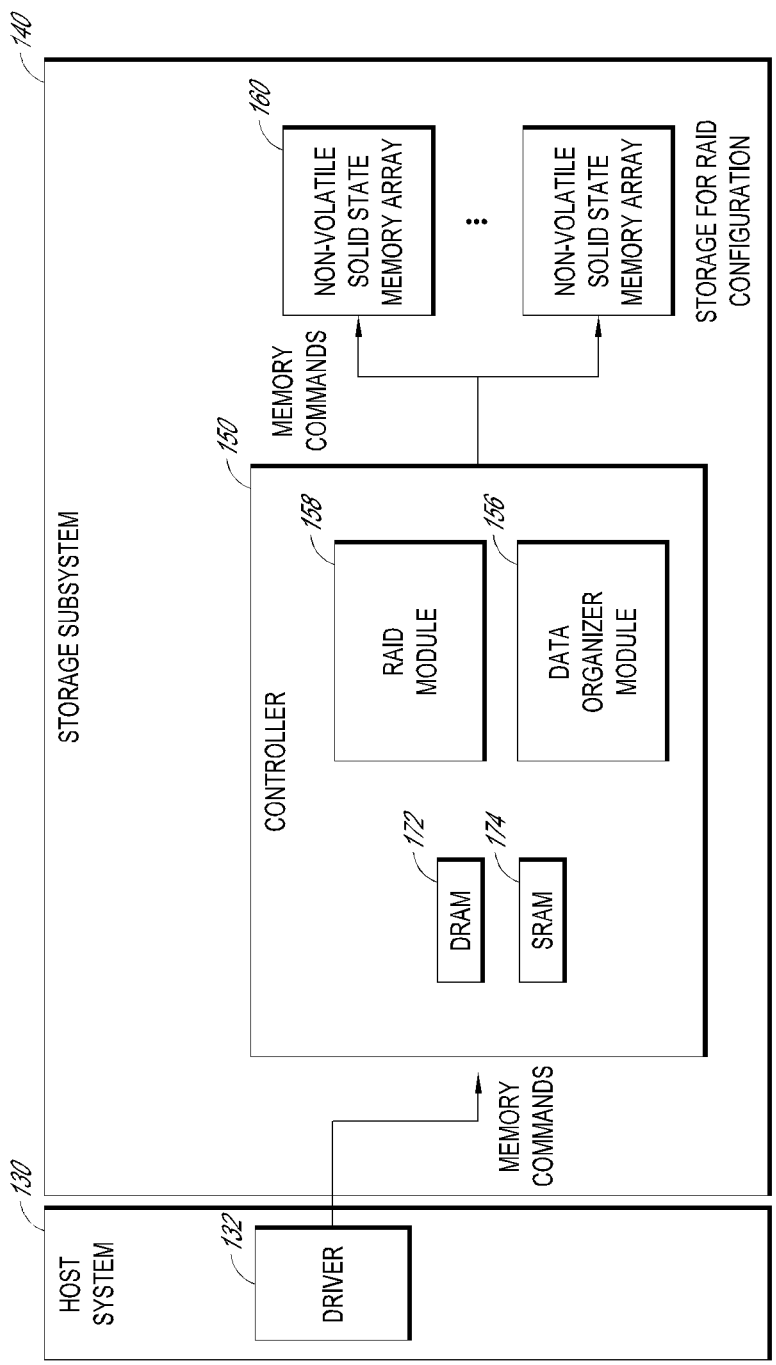
FIG. 1 is a block diagram illustrating a storage subsystem implementing a data redundancy scheme according to one embodiment.

FIG. 1 is a block diagram illustrating a storage subsystem implementing a data redundancy scheme according to one embodiment. As shown, a storage subsystem 140 includes a controller 150 and one or more non-volatile solid state memory arrays 160. The arrays may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid state storage devices may be physically divided into blocks, pages and sectors, as is known in the art. Other forms of storage (e.g., battery backed-up volatile DRAM or SRAM devices, magnetic disk drives, etc.) may additionally or alternatively be used.

The controller 150 in one embodiment in turn includes a RAID module 158 and a data organizer module 156. In other embodiments, the two modules may be separated into additional modules or combined into one module. In one embodiment, the RAID module 158 is configured to execute data access commands to maintain a data redundancy scheme in the storage subsystem. For example, the RAID module 158 may maintain data on which storage elements are assigned to a RAID stripe and is otherwise programmed to carry out the data redundancy operations. The data organizer module 156 in one embodiment is configured to organize data for storage in the one or more non-volatile solid state memory arrays 160, and in one embodiment, is tasked with assisting the RAID module 158 in the definition/creation of user data strips and generation of parity strips. In one embodiment, the controller may include a DRAM 172 and/or SRAM 174 for operations that require temporarily storing data in volatile memory. For example, the data organizer module 156 may temporarily store data in DRAM for parity calculation.

In one embodiment, the controller 150 of the storage subsystem 140 is configured to receive and execute commands from a device driver 132 in a host system 130. The memory commands from the driver 132 may include write and read commands issued by the host system 130. As further shown in FIG. 1, in one embodiment, the controller 150 executes the received commands in one or more non-volatile solid state memory arrays 160.

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

Parity Calculation

Figure 2:
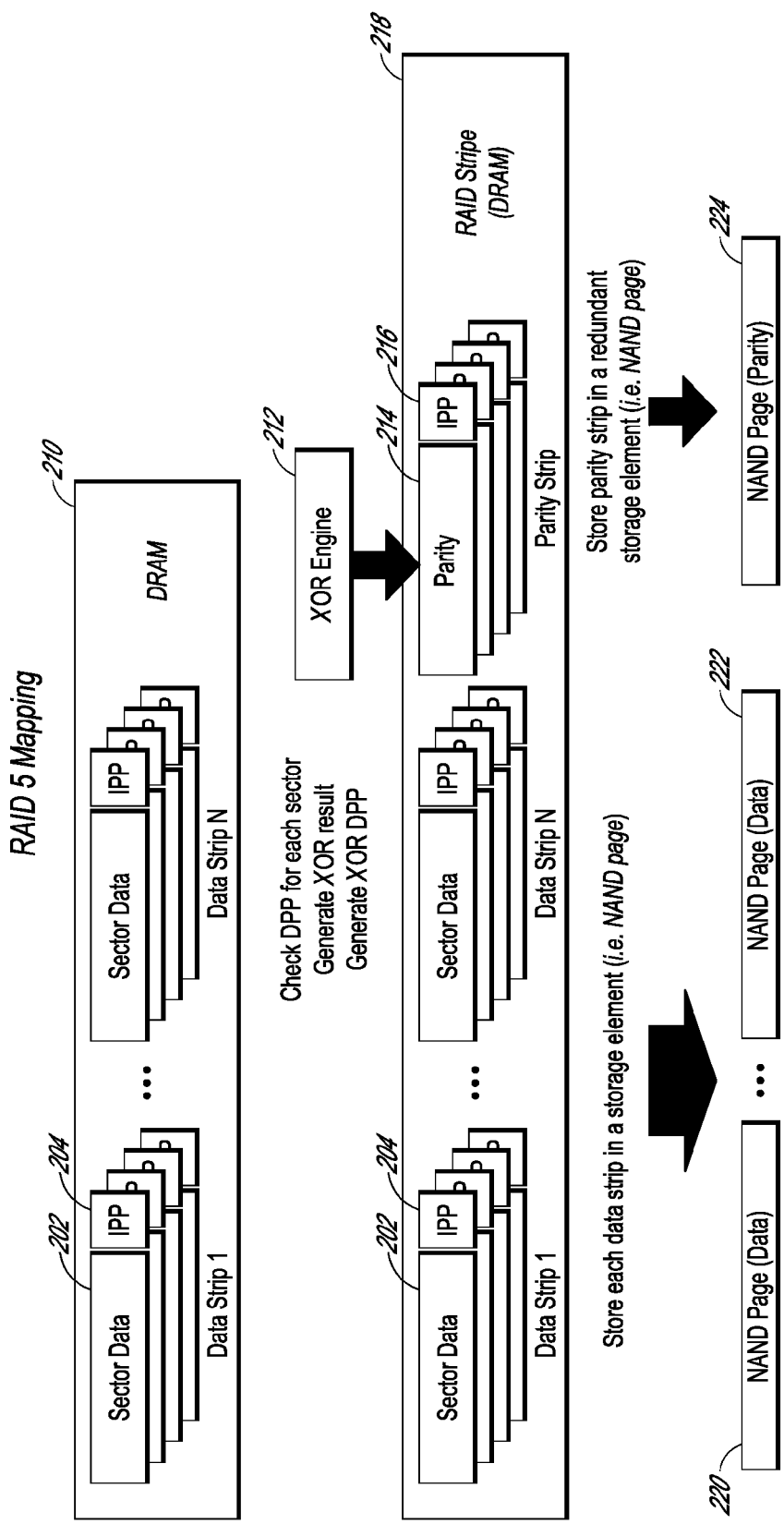
FIG. 2 is block diagram that illustrates an example data redundancy scheme.

FIG. 2 is block diagram that shows an example RAID 5 data redundancy scheme where the parity is calculated along storage element boundaries. The controller as shown defines a number of data strips 1 to N in DRAM 210. Each data strip is sized to include one or more units of sector data, where a sector is a data size used by the host operating system. Each sector data is protected by DPP (Data Path Protection, which in one embodiment is ECC (Error Correction Code)+LBA-seeded EDC (Logical Block Address-seeded Error Detection Code)) for error correction purposes. For example, sector data 202 in data strip 1 is protected by an associated DPP 204, which can be used to recover the sector data 202 should an error occur. Although DPP is shown here, various embodiments of the invention can employ other similar data error correction protocols.

Parity generation is also shown in FIG. 2. In this example, an XOR engine 212 checks the DPP for each sector, generates the XOR result as the parity, and generates the DPP for the XOR result. The overall result is shown in DRAM 218, which depicts the same physical DRAM as DRAM 210 but with different memory contents. As shown, the generated parity data 214 forms a parity strip. Each parity data is protected by an individual DPP 216. In this example, once the parity generation is completed in the DRAM, each of the data and parity strips is stored in a storage element of a non-volatile memory (e.g., a NAND page). Here, data strip 1 is stored in NAND page 220, data strip N is stored in NAND page 222, and parity strip is stored in NAND page 224. In this configuration, because the page size is an integer multiple of the sector size used by the host, parity calculation can be performed on clean sector boundaries.

Packing

Figure 3A:
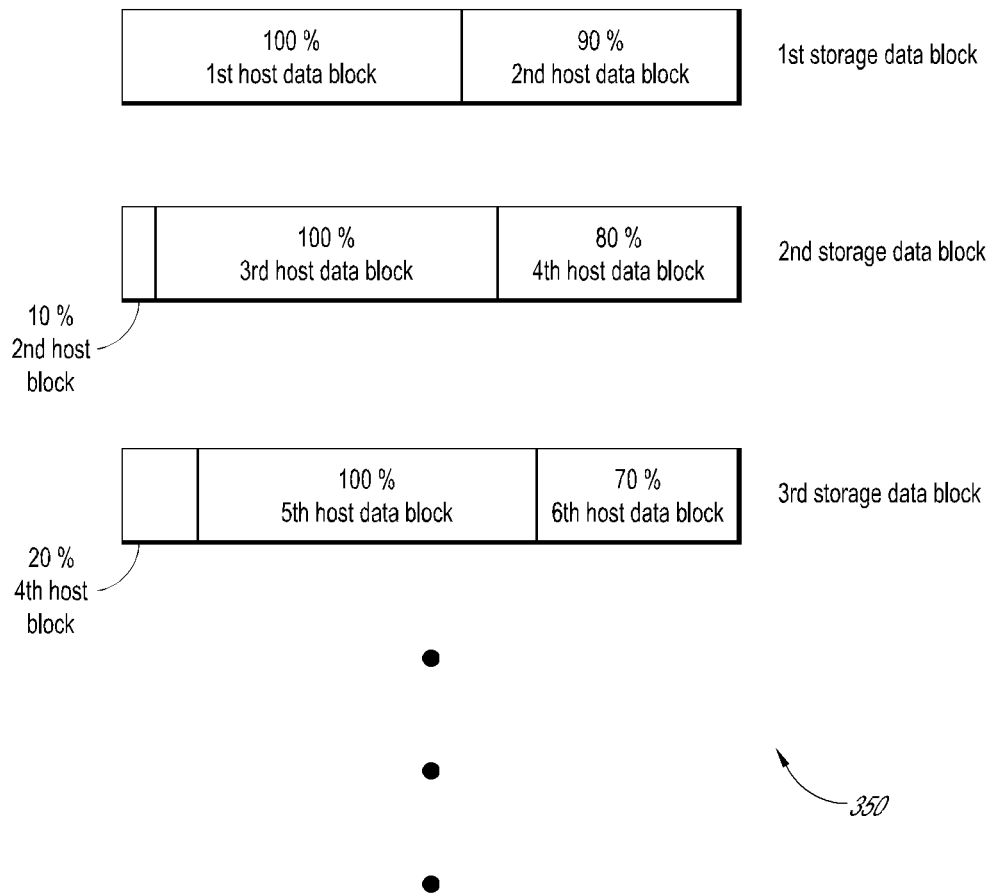
FIG. 3A is block diagram that illustrates an example of data packing.

When the storage element block size is not an integer multiple of the host interface block size, sometimes storage efficiency is maximized by "packing" storage elements with a non-integer multiple of host blocks. For example, in a system where host block size is 528 bytes and the storage block size is 1024 bytes, rather than storing one host block per storage block (52% efficiency), "packing" 15 host blocks into 8 storage blocks would increase efficiency to 89%. FIG. 3A is block diagram 350 that illustrates this example of data packing. In this example system, the first storage block contains the first host block and 90% of the second host block, the next storage block contains 10% of the second host block, the third host block, and 80% of the fourth host block, etc.

Improved Parity Determination

When "packing" and RAID 5 redundancy are required, the data strips in FIG. 2 can no longer include an integer number of host blocks (sectors) and parity calculation becomes much more complex because data stored in the DRAM is protected by DPP at the sector level (as previously shown in FIG. 2). To simplify the parity calculation, embodiments of the invention disassociate the parity calculation from a strict correlation with the physical storage element size. By allowing storage elements to contain partial data and/or parity strips, simplified parity generation and single storage element redundancy can be maintained as long as the strip size is equal to or greater than the storage element size.

Figure 3B:
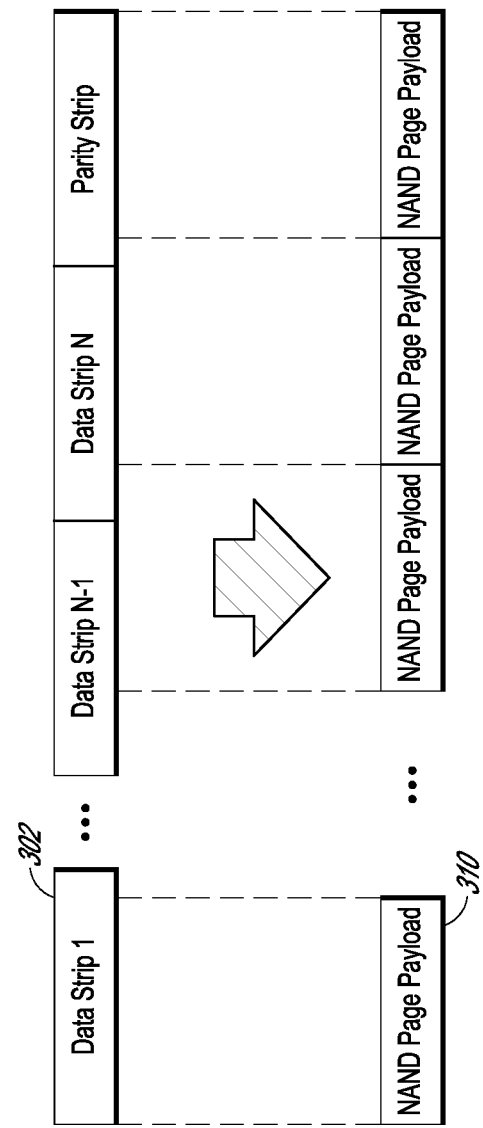
FIG. 3B is block diagram that illustrates a data redundancy scheme with parity determination according to one embodiment.

FIG. 3B is block diagram that illustrates a data redundancy scheme with parity determination according to one embodiment. While the general process (e.g., XOR, DPP generation) follows that of FIG. 2, in FIG. 3B each data strip is no longer aligned with the storage element size (e.g., NAND page size in this example). For example, data strip 302 is now larger than a NAND page, and as a result the controller would store data strip 302 in NAND page 310 and an adjacent NAND page. The size of data strip is chosen to be an integer multiple of the host data size (sector size), so a strip can contain a discrete number of sectors. The effect of this arrangement is that data is packed in the physical storage element in the non-volatile memory. In this example, each page is filled with data and unused space is minimized. While the net effect is that many pages will likely contain partial strips, the parity management is simplified because the parity in generated along the data strip boundaries (which are still properly aligned with host sectors) and not the page boundaries.

Embodiments of the invention depart from prior implementations where parity is typically generated along boundaries of the physical storage elements in the non-volatile memory. This means that the controller typically accumulates data to be written to the non-volatile memory right before it is programmed in order to properly calculate parity. Embodiments of the invention remove the tie-in to the physical storage element boundaries and free the controller to perform the task of data accumulation and parity calculation at any point in the course of processing write commands.

In a system where storage element size is not aligned to host data size, embodiments of the invention simplify the performance case of generating and storing parity during write without requiring large SRAM accumulators or multiple DRAM data read passes, alternatives that respectively increase cost and reduce performance. While data recreate on storage element failure is not optimized by this approach, the use case is infrequent and has significantly reduced performance requirements compared to normal write operation.

Figure 4:
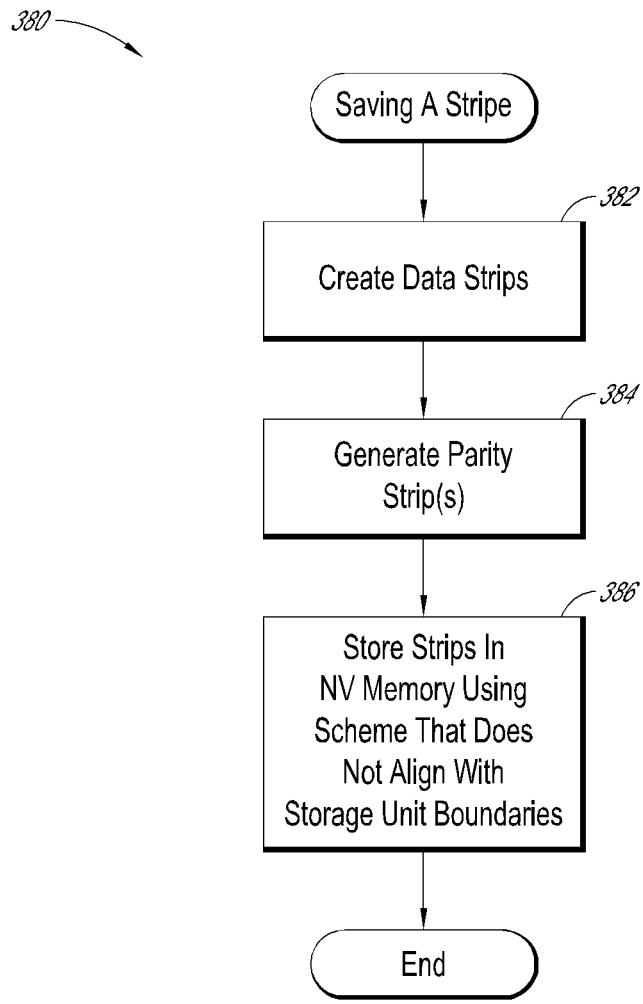
FIG. 4 is a flow diagram that illustrates the stripe creation process according to one embodiment.

FIG. 4 is a flow diagram that illustrates the stripe creation process according to one embodiment. The process may be performed by the controller 150, and in particular by the data organizer module 156 and/or the RAID module 158. In block 382, the process defines data strips for creation. The data strips may be created based on data received from the host and/or other data that needs to be stored as a result of internal operations such as wear leveling or garbage collection. In block 384, the process generates the parity strips as previously discussed above. In block 386, the process stores the data and parity strips in the non-volatile memory using the above described storage configuration that does not necessarily align with the storage element boundaries (e.g., page boundaries). As discussed above, in one embodiment, the strips are not aligned with the page boundaries but instead are sized to be an integer multiple of the host data size, and the strip size is configured to be equal to or greater than the page size in this embodiment. If a page fails, the lost data can be recovered since the page size is smaller than the strip size. Other embodiments generalize this concept wherein data redundancy is ensured with this improved parity determination approach as long as the parity protection size (strip size) is equal to or greater than the minimum unit of failure in the storage, be it a page, block, sector, etc.

Conclusion

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIG. 4 may differ from those shown in the figures. Depending on the embodiment, certain of the steps described in the example above may be removed, others may be added, and the sequence of steps may be altered and/or performed in parallel. Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of improving a data redundancy configuration in a solid state storage device, the method comprising:
defining a plurality of data strips for data to be written in the solid state storage device in accordance with a data redundancy configuration with a plurality of data stripes, each of the stripes comprising a plurality of data strips, wherein the storage device comprises a plurality of storage elements, each storage element representing a smallest unit of storage that can be programmed, wherein a size of each storage element is a non-integer multiple of a size of each data strip;
determining a subset of the plurality of storage elements of the solid-state storage device for storing the plurality of data strips of a stripe;
storing each of the data strips in the subset of storage elements so that at least one data strip is stored in at least two portions in two different storage elements, a first portion stored with data not associated with the at least one data strip in a first storage element and a second portion stored with data not associated with the at least one data strip in a second storage element; and
generating a parity strip for the defined plurality of data strips of the stripe along boundaries of the defined plurality of data strips and not along boundaries of the storage elements in the storage device, and storing the parity strip in the storage device,
wherein generating the parity strip comprises using combined first and second portions of the at least one data strip for parity generation without data unassociated with the at least one data strip that is also stored in the first and second storage elements.

2. The method of claim 1, wherein the storing stores each of the data strips and the parity strip in the storage device in accordance with a packing configuration to reduce an amount of space in the storage elements not used to store a data strip or a parity strip.

3. The method of claim 1, wherein the size of each data strip is an integer multiple of the size of a smallest addressable data unit used by a host operating system that sends data to the solid state storage device for storage.

4. The method of claim 1, wherein each of the storage elements is a page.

5. The method of claim 1, wherein the data redundancy configuration is a redundant array of independent disks (RAID) configuration.

6. A solid state storage device comprising:
a non-volatile memory array configured to implement a data redundancy configuration with a plurality of data stripes with each of the stripes comprising a plurality of data strips, the non-volatile memory array comprising a plurality of storage elements used to store the data stripes, each storage element representing a smallest unit of storage that can be programmed; and
a controller configured to:
receive data to be written to the non-volatile memory array;
define, based on the received data, a plurality of data strips to store the received data in accordance with a data redundancy configuration;
determine a subset of the plurality of storage elements of the non-volatile memory array for storing the plurality of data strips of a stripe;
store each of the data strips in the subset of storage elements so that at least one data strip is stored in at least two portions in two different storage elements, a first portion stored with data not associated with the at least one data strip in a first storage element and a second portion stored with data not associated with the at least one data strip in a second storage element; and
generate a parity strip for the defined plurality of data strips assigned to the stripe, along boundaries of the defined plurality of data strips and not along boundaries of the storage elements in the non-volatile memory array, and storing the parity strip in the non-volatile memory array,
wherein generating the parity strip comprises using combined first and second portions of the at least one data strip for parity generation without data unassociated with the at least one data strip that is also stored in the first and second storage elements.

7. The storage device of claim 6, wherein the size of each storage element is a non-integer multiple of the size of each data strip.

8. The storage device of claim 6, wherein the controller is further configured to store each of the data strips and the parity strip in the non-volatile memory array in accordance with a packing configuration to reduce an amount of space in the storage elements not used to store a data strip or a parity strip.

9. The storage device of claim 6, wherein the size of each data strip is an integer multiple of the size of a smallest addressable data unit used by a host operating system that sends data to the solid state storage device for storage.

10. The storage device of claim 6, wherein each of the storage elements is a page.

11. The storage device of claim 6, wherein the data redundancy configuration is a redundant array of independent disks (RAID) configuration.

12. The method of claim 3, wherein the size of each data strip is equal to or greater than the size of the smallest addressable data unit used by the host operating system.

13. The storage device of claim 9, wherein the size of each data strip is equal to or greater than the size of the smallest addressable data unit used by the host operating system.

* * * * *